United States Patent [19]

Offers et al.

[11] Patent Number: 5,073,923
[45] Date of Patent: Dec. 17, 1991

[54] PRIVATE TELEPHONE SYSTEM WITH UNIFIED COMMAND FEATURE

[75] Inventors: Albert G. Offers, Calgary; Christopher D. White; Roderick B. Story, both of Ottawa, all of Canada

[73] Assignee: Northern Telecom Limited, Montreal, Canada

[21] Appl. No.: 630,580

[22] Filed: Dec. 20, 1990

Related U.S. Application Data

[63] Continuation of Ser. No. 507,828, Apr. 12, 1990, abandoned.

[51] Int. Cl.⁵ .............................................. H04M 3/42
[52] U.S. Cl. ...................................... 379/165; 379/159
[58] Field of Search ............... 379/156, 157, 159, 165; 370/110.1

[56] References Cited

U.S. PATENT DOCUMENTS

4,873,718 10/1989 Barnett et al. ....................... 379/156
4,893,310 1/1990 Robertson et al. ............... 370/110.1
4,958,370 9/1990 Shimanuki .......................... 379/157

OTHER PUBLICATIONS

Meridian Norstar, New Generation in Key System Design, B. Lewis & N. Tsiakes Telesis 1989 Two, pp. 5–19.

Primary Examiner—Stafford D. Schreyer
Attorney, Agent, or Firm—J. E. Moorhouse

[57] ABSTRACT

A key telephone system, having ports for connection to telephone lines of a telephone exchange and ports for connection of terminal apparatus including key telephone sets, is provided with the ability to distinguish if an intended call or feature access involves more than the key telephone system. If so, a signalling protocol of the telephone exchange is emulated on behalf of the terminal apparatus and transmitted via one of the telephone lines whereby the progress of the call or feature access continues, as if a user of the terminal apparatus had initiated the signalling protocol of the telephone exchange.

12 Claims, 8 Drawing Sheets

PRIVATE TELEPHONE SYSTEM WITH UNIFIED COMMAND FEATURE

This application is a continuation of application Ser. No. 507,828 filed on Apr. 12, 1990, in the name of A. G. Offers et al and titled "Private Telephone System With Simplified Command Feature", abandoned.

FIELD OF THE INVENTION

The invention is in the field of private telephone systems and relates to commands required of a telephone user to effect a function such as originating a call, or accessing a telephony feature.

BACKGROUND OF THE INVENTION

A private telephone system may be provided in any of three basic configurations, namely, a private branch exchange, a key telephone system or a special line group terminated at a central office (CO) exchange which includes a centrex feature. A centrex feature, hereinafter referred to as centrex, provides private branch exchange (PBX) functionality for the special line group. PBX functionality is characterized by a simplified number plan which identifies extensions by two, three, or four digit numbers, depending upon the size of the PBX. This is in contrast to a minimum of seven digits typically required for a directory number (DN) serviced by a public CO exchange. In the event that a PBX user or a centrex user desires to originate a telephone call to a subscriber of the public telephone service, such is indicated to the PBX or to the centrex by a predetermined digit, a nine for example, which is dialled before the digits of the subscriber's DN are dialled.

Key telephone systems tend to be characterized by a plurality of key telephone sets being connected to a plurality of CO telephone lines and a separate set of leads, exclusive to the key telephone system which may be utilized for intercommunications between the key telephone sets without recourse to accessing the CO. This is referred to as an intercom feature and may be voice or dial activated. In any event, before dialling, the key telephone system use must decide which means of communication will be used. Thereafter, the user depresses an appropriate key on the telephone set to select an intercom line or a CO line.

Key telephone systems are typified as being of low cost at small sizes, as compared to PBX in which common equipment is a major expense. For example, three CO lines may be shared among six to twelve telephone sets, each of which has access to any of the lines for exercising basic well known features such as "hold", "privacy" and "intercom", in addition to plain ordinary telephone service (POTS).

As before mentioned, the basic features available via the PBX are also available at the central office exchange, via centrex. These may include a wealth of calling features such as abbreviated dialling, speed calling, dial-by-name, ring again, conference, to name but a few.

Many of these features are thus available via the key telephone system, specifically for those of the key telephone sets that are served by one or more PBX or centrex lines. Of course the key telephone system user must be aware of each of the features and how to access same, before any user advantage is experienced. In the centrex example, if the key telephone system user wishes to conference with several numbers, one of them being outside of the key telephone systems, the key telephone system user must remember to access the conference feature in the CO, while ignoring the key telephone system conference feature. This is merely a simple example of the knowledge required of the user in order that the advantages of telephony features may be made of use. It has been found that as more features become available, access requirements in the mix of locally and centrally provided features has become confusing to many telephone users. Consequently, many potential feature users simply restrict themselves to using POTS, as methods of feature utilization are incomprehensible for them.

SUMMARY OF THE INVENTION

It is an object of the invention to provide a key telephone system wherein an attempt by a user to access a telephony feature foreign to the key telephone system but otherwise implementable by way of an associated telephone exchange is recognized by the key telephone system and invoked in the associated telephone exchange by the key telephone system, on behalf of the user.

It is also an object of the invention to provide a key telephone system wherein an apparent attempt by a user to initiate a call progress to a telephone set, which unbeknownst to the user is not in the key telephone system but is connected with an associated telephone exchange, will be furthered on behalf of the user, by an emulation of the access and signalling protocol of the associated telephone exchange, said emulation being performed by the key telephone system.

The invention is a method of operating a key telephone system, the key telephone system including a central processor, a first plurality of ports, each of which is available for connection of a telephone line of a telephone exchange, another plurality of ports, each of which is available for connection of an apparatus thereto, each port connected apparatus including an interface device for exchanging signals with the port in an operating signal format of the port, and means associated with the first plurality of ports for translating between a signalling and supervision format of the telephone line and an operating signal format of the other plurality of ports. The method comprises the steps of:

recognizing a message, from a port connected apparatus, of a context wherein access to a telephony feature is specified;

determining the specified feature to require participation of the telephone exchange;

emulating a feature access protocol of the telephone exchange in response to the context of the message; and signalling the emulated feature access protocol via the telephone line, whereby a user of said port connected apparatus may be availed of a feature of the telephone exchange.

The invention is also a method of initiating a call progress in a key telephone system which includes a first plurality of ports, each of which is available for connection of a telephone line of a telephone exchange, another plurality of ports each of which is available for connection of an apparatus thereto, each port connected apparatus including an interface device for exchanging signals with the port in an operating signal format of the port, and means associated with the first plurality of ports for translating between a signalling and supervision format of the telephone line and the operating signal format of the other ports. The method comprises the steps of:

a) initiating a call progress, at one of the apparatus, by signalling a dialled number b) recognizing the dialled number to be in a number plan of the key telephone system and continuing the call progress within the key telephone system; and if the dialled number is not so recognized, c) seizing a telephone line and continuing the call progress through the telephone exchange.

A key telephone system, in accordance with the invention includes a first plurality of ports each of which is available for connection to a telephone line of a telephone exchange; another plurality of ports, each of which is available for connection of an apparatus thereto; each port connected apparatus including an interface device for exchanging signals with the port in an operating signal format of the port; means associated with the first plurality of ports for translating between a signalling and supervision format of the telephone line and the operating signal format of the other ports, and a central processor for directing provision of communication paths between any of said ports. The key telephone system further comprises: means for recognizing a message, from a port connected apparatus, wherein the message is of a context which specifies access to a telephony feature; means for determining if the specified feature requires participation of the telephone exchange and for providing an indication of same; and means responsive to the indication, for emulating a feature access protocol of the telephone switching system in accordance with the context of the message and in response to the indication.

Another key telephone system, also in accordance with the invention includes a first plurality of ports each of which is available for connection to a telephone line of a telephone exchange; another plurality of ports, each of which is available for connection of an apparatus thereto; each port connected apparatus including an interface device for exchanging signals with the port in an operating signal format of the port; means associated with the first plurality of ports for translating between a signalling and supervision format of the telephone line and the operating signal format of the other ports, and a central processor for directing provision of communication paths between any of said ports. The key telephone system further comprises: means for recognizing dialled numbers to be in a number plan of the key telephone system, and for indicating an occurrence of a dialled number to be other than in the number plan of the key telephone system; and means for causing the dialled number to be signalled via one of the telephone lines in response to the indication.

BRIEF DESCRIPTION OF THE DRAWINGS

An example embodiment is described with reference to the accompanying drawing in which: .

DESCRIPTION OF THE EXAMPLE EMBODIMENT

Figure 1:
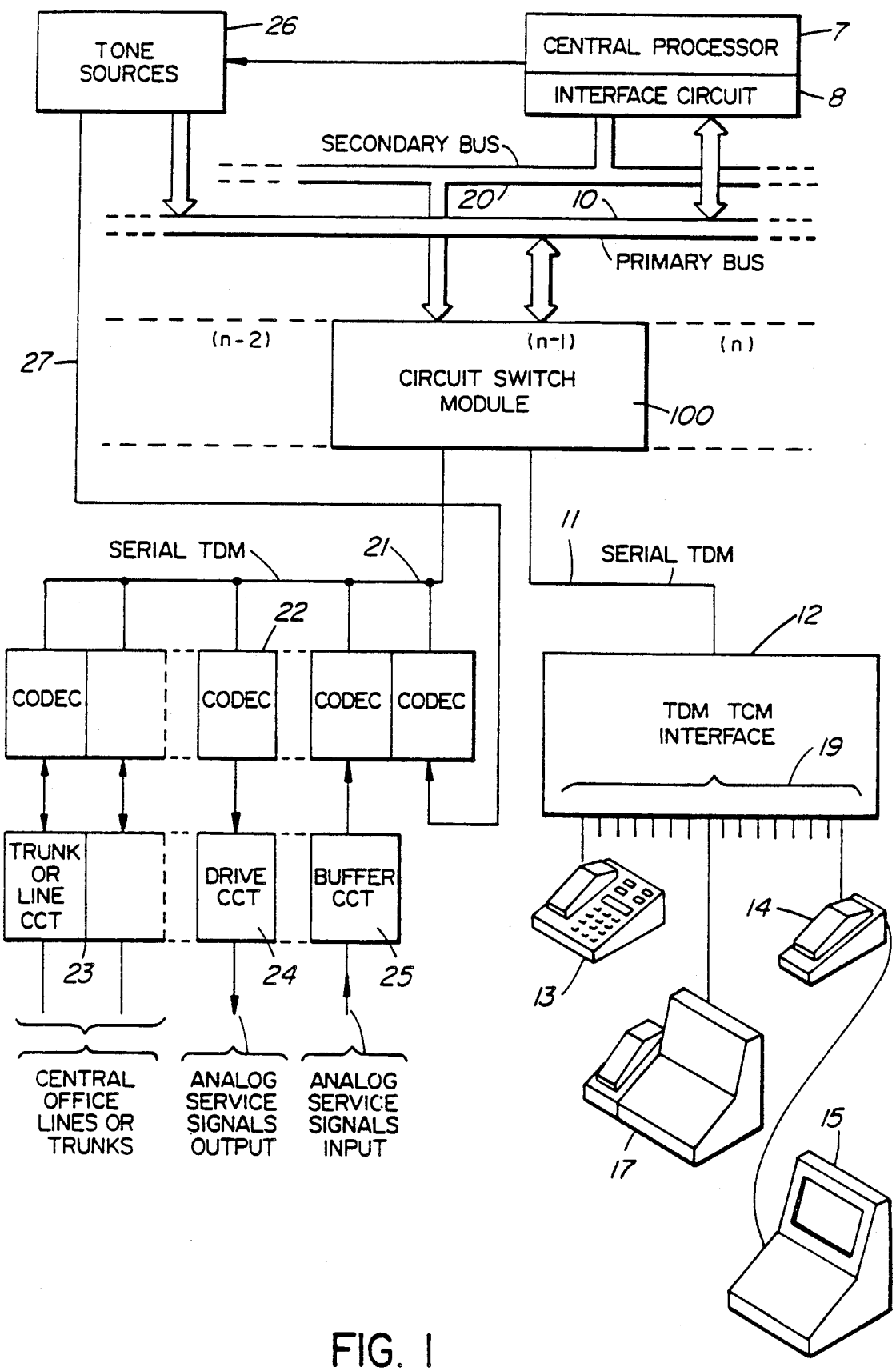
FIG. 1 is a block diagram of a digital key telephone system in accordance with the invention.

In FIG. 1 a digital key telephone system (DKS) provides for connection of various digital telephone instruments, as exemplified at 13 and 14, and various digital data terminals, personal computers or the like, as exemplified at 15 and 17, which are able to communicate, via the system, with one another as appropriate, and with other devices via line or trunk circuits 23. The lines and or trunks serve to connect the digital key telephone system with other telephone facilities, for example a central office or private exchange, not shown. A back bone of the digital key telephone system is provided by a short parallel time division multiplex (TDM) bus 10, which provides a wide band communication path between up to nine 64 channel circuit switch modules 100, a central processor interface circuit 8 and tone sources 26. If any of the tone sources 26 provide an analog signal, such is coupled into the system via a lead 27. The bus 10 is referred to as a primary bus, and a secondary bus 20, similar to the primary bus 10, provides for unidirectional communications from the interface circuit 8. Each of the circuit switch modules 100 couples 64 ten bit transmit serial channels to predetermined corresponding time slots in the bus 10, and up to 64 parallel selected TDM time slots on either of the buses 10 or 20 to 64 ten bit receive serial channels. 32 of the serial transmit and receive channels are coupled to an internal ports circuit 12 via a serial TDM path 11. The remaining 32 serial transmit and receive channels are coupled to external port circuits at 22 via a serial TDM path 21. Each of the channels is capable of transmitting a binary signal pulse stream at a rate of 80 kilo bits per second, with at least 64 kilo bits per second being available as a channel for pulse code modulated (PCM) voice information, or data information. The remaining sixteen kilobits may be committed to supervisory and signalling communications, in association with the PCM or data information. In this example the internal ports circuit 12 consists of sixteen TDM time compression multiplex (TCM) interfaces. The TCM method of signal transmission is sometimes referred to as "Ping Pong" transmission. Each of these interfaces provides a transmit path between each of TCM links 19 and two predetermined and fixed serial TDM channels in the serial TDM path 11. In a similar manner analog signals are interfaced to and from various trunk or line circuits shown at 23, 24 and 25, via the serial TDM path 21 and the external ports 22 provided by CODEC circuits. Alternately, it may be advantageous to provide an external TDM port for interfacing with another telephone facility via a digital signal transmission link, T1 or DS30 for example. However in this case, each CODEC circuit interfaces with a predetermined and fixed transmit and receive channel pair of the serial TDM path 21. Hence, for each and every port (that is a place where a digital telephone instrument or other digital device or a digitally interfaced or compatible line, trunk and the like may be connected to the digital key telephone system), there is at least one predetermined ten bit parallel time slot in the primary bus 10 which is allocated to receive information from the line appearance. In an alternate example, the time slots on the bus 10 correspond to line appearances for the purpose of transmitting information thereto. However, such alternate example is not herein further discussed. A central processor 7 is coupled via the interface circuit 8 to the primary bus 10 for communication via a predetermined 32 of the ten bit parallel time slots. The interface circuit 8 may receive all ten bits of each time slot on the bus 10. Normally, only the two bits corresponding to a sixteen kilobit subchannel are transferred from the bus 10 of the central processor. The interface circuit 8 provides signalling and supervision from the central processor 7 via the secondary bus 20 at time slot occurrences corresponding to intended line appearance destinations via the appropriate circuit switch module 100. Therefore each circuit switch module 100 transmits 10 bits to the primary bus 10 but receives and switches only 8 bits from the primary bus 10. The other two bits are received at the appropriate time via the secondary bus 20.

In this example, each port associated communication path provides for full duplex operation with two words of ten bits each being exchanged every 125 micro seconds. In at least one of these words, bit positions 0–7 are dedicated to one of data or voice, the bit position 8 is dedicated to signalling and supervision, and the bit position 9 is dedicated to validation of signalling and supervision. The signalling and supervision information is collected from, and distributed to, the port associated channels via the interface circuit 8 under the direction of the central processor 7. The collected information is gathered into byte groupings by the interface circuit 8 for transfer to the central processor 7 and by a somewhat complimentary function, information is distributed from the central processor 7, via the interface circuit 8 into bit position 8 of a selected one of the channels or of all the channels.

The key telephone system is intended to support two generically different types of station apparatus: one being a very basic telephone station set hereafter referred to as a STIMULUS set or an S set, which includes a bit stream interface device, a simple processing device, and a CODEC; and the other being a more complex featured autonomous station apparatus which may take the form of a proprietary key telephone set, interface apparatus, or proprietary display telephone or data terminal. Such instrument is referred to as a FUNCTIONAL set and such reference is intended to indicate that the apparatus contains some call processing instructions in the form of software or firmware. For convenience, any station apparatus which is not an S set is hereafter referred to as a FUNCTIONAL set or an F set.

In the S set, any change in its operating state, for example ON HOOK to OFF HOOK or a key depression, is communicated to the central processor, via the S set processing device, the bit position 8 and the interface device. This is accomplished in the S set by a continuous (request to send RTS) assertion of "00" in the bit position 8 and 9 of the outgoing channel, until a validated clear to send (CTS) is received in bit positions 8 and 9 of the incoming channel. When the CTS is recognized in the S set a STIMULUS protocol message indicating OFF HOOK is transmitted via the S and S bit positions 8. Thereafter, a typical call progress proceeds by way of exchange of STIMULUS protocol messages.

By way of exemplary contrast in the F set, a request to send (RTS) may be generated after an OFF HOOK is followed by sufficient telephone call dialling information having been keyed in by a telephone user. In this case the processing device and its operational programming perform basic call processing, and in addition to providing dial tone at the appropriate moment, may also generate ring back or busy tone. The F set communicates similar to the S set, using the S and S bit positions 8. After a CTS is received from the central processor, the F set transmits a FUNCTIONAL protocol message.

Table 1 illustrates structural arrangements of messages of STIMULUS protocol and FUNCTIONAL protocol.

TABLE 1

| HEADER Binary | (HEX) | TYPE | LENGTH |
|---|---|---|---|
| 0X000000 to 0X011111 | (40H) to (5FH) | STIMULUS | 1 BYTE |
| 0X100000 to 0X100111 | (60H) to (67H) | STIMULUS | 2 BYTES |
| 0X1010000 to 0X101111 | (68H) to (6FH) | STIMULUS | MULTI-BYTE |
| 0X110000 to 0X111111 | (70H) to (7FH) | FUNCTIONAL | VARIABLE |

In the header, bit positions left to right are 7 through 0. In particular, bit positions 5 and 4 indicate the protocol of the message. FUNCTIONAL messages in this arrangement are indicated by both of the bit positions 5 and 4 being asserted "1". S STIMULUS MESSAGES are indicated by at least one of the bit positions 5 and 4 being asserted 37 "0". The purpose of each of the bit positions in the header as illustrated in Table 2.

TABLE 2

| BIT | 7 | 6 | 5 | 4 | 3 | 2 | 1 | 0 |
|---|---|---|---|---|---|---|---|---|
| PURPOSE | START | CLEAR TO SEND | PROTOCOL | | SECONDARY INFORMATION | | | |

In the case of a header being in a range of 40H–5FH, the header is the actual message, the gist of which is carried in the bit positions 3–0. In messages of more than one byte, the second and subsequent bytes carry information. The quantity or number of the information bytes within a message are specified in lesser significant bit positions of the header.

The CTS bit position indicates a clear to send message and is only of significance when received by an F set or an S set.

Figure 2:
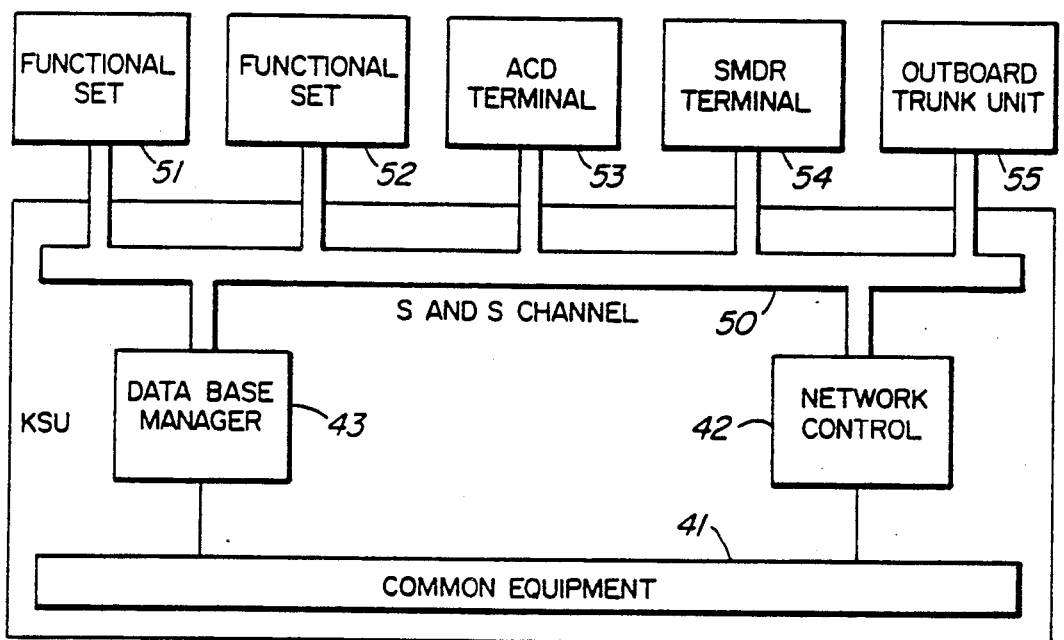
FIG. 2 is a block diagram of a software architecture for supporting FUNCTIONAL station apparatus in the key telephone system in FIG. 1.
Figure 3:
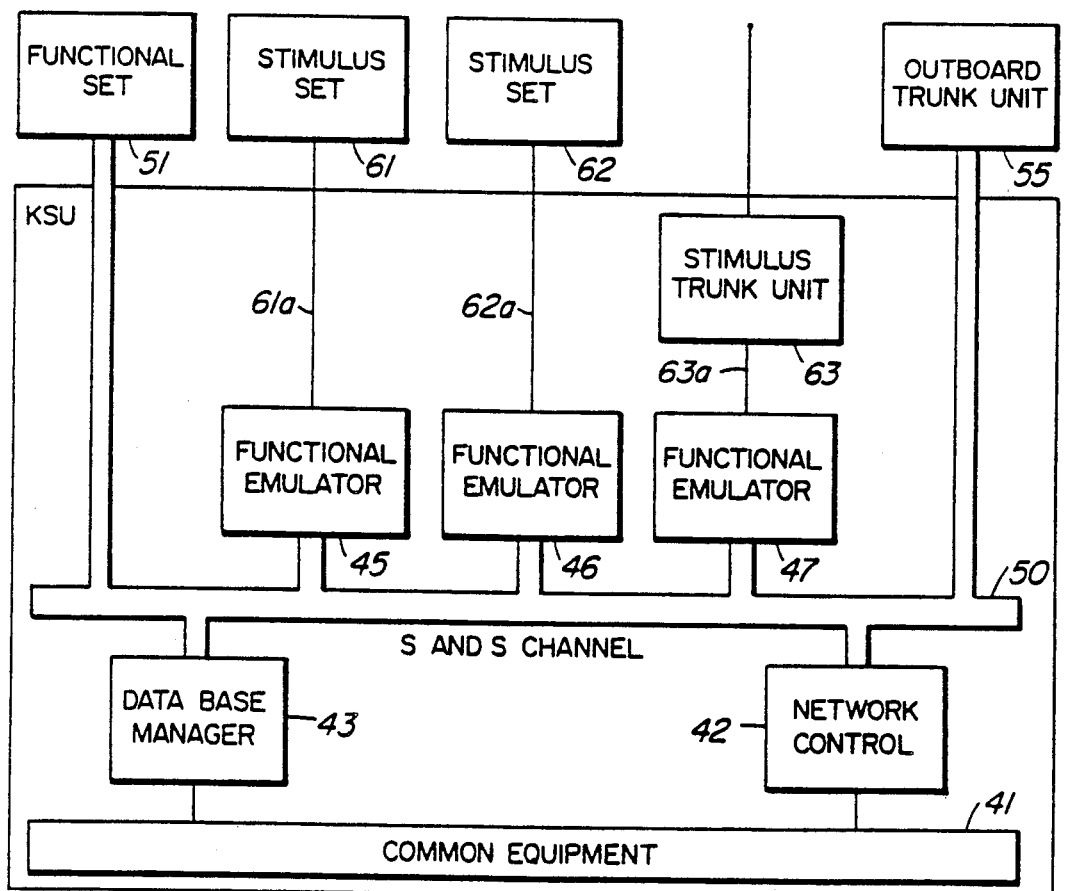
FIG. 3 is a block diagram of a software architecture similar to the software architecture illustrated in FIG. 2 but with an added capability of supporting STIMULUS station apparatus as well as the FUNCTIONAL station apparatus.

Plural protocols and central processor flow control of messages, communicated via the S and S bit positions, permit advantageous software architectures as illustrated in FIGS. 2 and 3, to be resident in a key telephone system as shown in FIG. 1. In FIG. 2 a key system unit (KSU) 40 includes common equipment 41 coupled with an S and S channel 50 via software elements, namely a network controller 42 and a data base manager 43. The common equipment 41 is in effect representative of a hardware interface with the buses 10 and 20 in FIG. 1 but also includes firmware and software resident in the central processor 7. In this example, the central processor 7 is provided by a 68008 microprocessor available from Motorola Corp., of 1303 East Algonquin Road, Roselle, Ill., 60196, U.S.A. The central processor 7 is arranged to support modularized software elements such as the elements 42 and 43.

The S and S channel is a message channel which is in operational effect common to all the FUNCTION station apparatus of the system. Exemplified are F sets 51 and 52, an automatic call distribution (ACD) terminal 53, a system management data retrieval (SMDR) terminal 54 and an outboard trunk unit 55 for connection to a central office (not shown). Each of these is a FUNCTIONAL apparatus which includes its own processing device and call processing software.

FIG. 3 illustrates an example of an architecture configured similar to FIG. 2 but for supporting STIMULUS sets in addition to FUNCTIONAL sets. In this case, the common equipment 41 also supports additional modular software in the form of FUNCTIONAL emulators 45, 46 and 47. These FUNCTIONAL emulators perform, on behalf of respective STIMULUS sets 61 and 62, and a STIMULUS trunk unit 63, to make these appear to the rest of the key telephone system to also be FUNCTIONAL sets. Hence, in some system configurations, economy on a per port basis is achieved. It should be noted that FUNCTIONAL elements 52-54 may also be present in FIG. 3 but were omitted for convenience of illustration.

In operation of the key telephone systems in accordance with FIGS. 2 or 3, any F set receiving a CTS message is able to transmit to all FUNCTIONAL entities, be these apparatus or emulators. Likewise F emulators are able to transmit to all FUNCTIONAL entities but as the F emulators are software based in the KSU, the previously discussed arbitration ritual of FTS and CTS is not required. Any FUNCTIONAL entity which may thus respond or act in accordance with its own programming as warranted by the content of the transmitted FUNCTIONAL message. Any such FUNCTIONAL message involving a STIMULUS set is intercepted and subsequently acted upon by the corresponding FUNCTIONAL emulator software module. This effectively results in a series of STIMULUS messages being exchanged between the FUNCTIONAL emulator and its associated STIMULUS set via its S and S channel. For example, S set 61 and emulator 45 exchange messages via 25 an S and S channel 61a.

In FUNCTIONAL messaging the message bits are distributed or relayed to every channel occurrence in each frame. Although STIMULUS sets or units are thus exposed to the FUNCTIONAL messages, the STIMULUS processor devices therein are arranged to disregard FUNCTIONAL messages as recognized by the distinct header as illustrated in the foregoing tables 1 and 2. On the other hand, STIMULUS messages are unidirectional. Distribution of a STIMULUS message is confined to the channel occurrence which corresponds to a STIMULUS set for which the STIMULUS message is destined.

Figure 4:
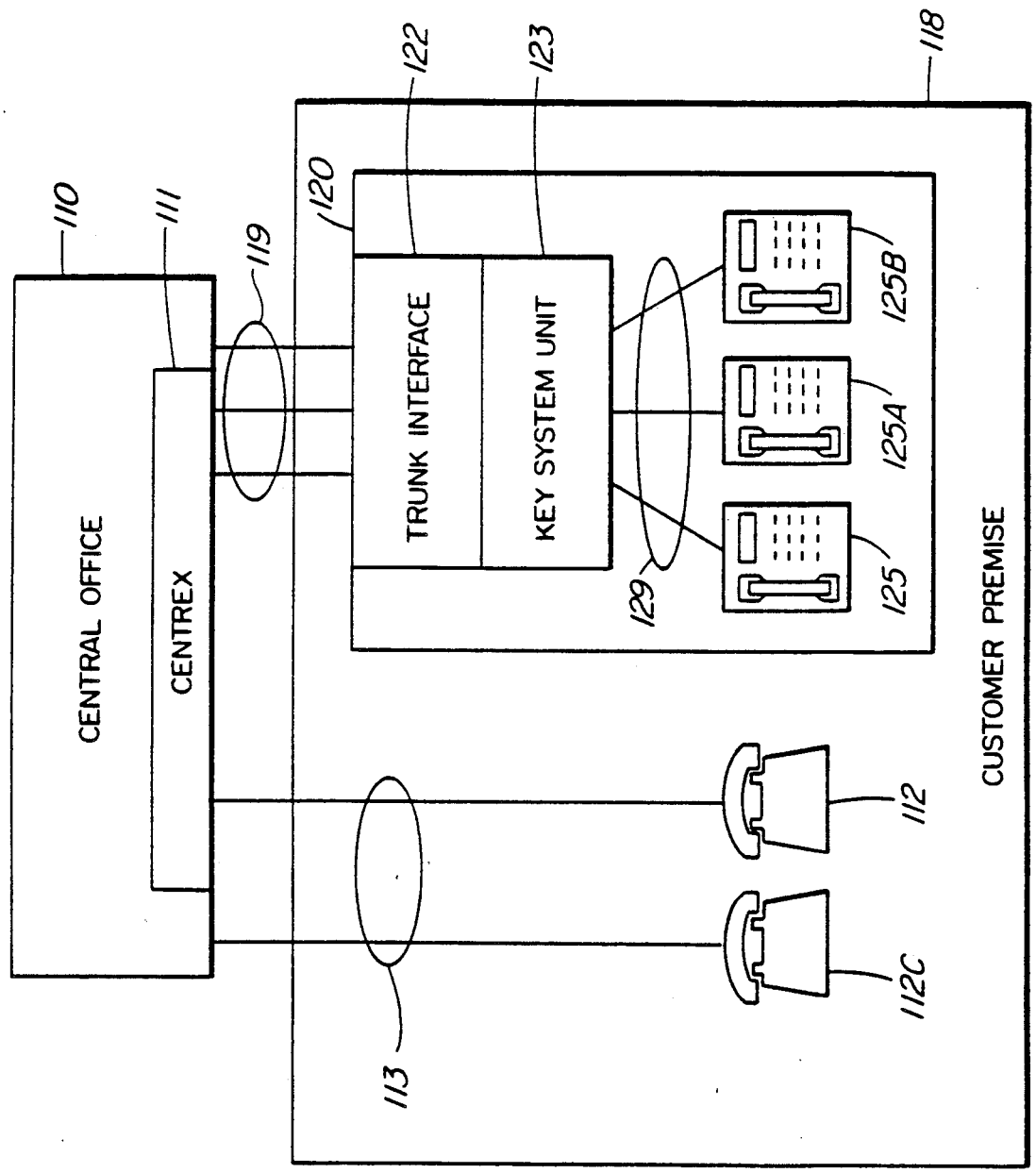
FIG. 4 is a block diagram illustrating a customer or user's premise being served with telephone equipment connected to a centrex featured telephone central office, which is often simply referred to as a centrex.

When the DKS was first introduced to the marketplace, it was intended to be compatible with centrex service, either alone at a user's premise or in combination with other centrex supported telephones as illustrated in FIG. 4. In FIG. 4, a public network central office equipment 110 includes a centrex feature 111 which is connected to support telephone sets 112 and 112C within a customer premise 118 via telephone lines 113. A digital key telephone system (DKS) 120 is located at the customer premise 118. The DKS 120 is an abbreviated illustration of the system in FIG. 1, and is shown to include a trunk interface 122 coupled with a key system unit 123 which supports digital key telephone sets 125, 125A and 125B, via digital telephone lines 129. The DKS 120 is connected to the centrex 111 via telephone trunks 119. Of course many more telephone sets and digital key telephone sets may be provided, the quantity shown in FIG. 5 being limited only as a matter of illustrative convenience.

As it is required that the DKS function compatibly with central offices including those providing a centrex, the DKS was equipped with centrex reach-through capabilities such as distinctive ringing and programmable link time. Distinctive ringing allows any special centrex ringing to be passed directly to a set, as for example in a manner somewhat similar to that disclosed in U.S. patent application Ser. No. 406,860 filed on Sept. 12, 1989. Programmable link time allows the DKS to be compatible with the timing interval requirements of any particular central office and many PBXs. Services available through the reachthrough capabilities extend centrex feature network services to the DKS, for example automatic route selection, time of day routing, access to tie lines, enhanced conferencing, and call forward capabilities. However we have found that many individual telephone users fail to make use of man of these services because of perceived complexities and inconsistencies, or because of a past embarrassing experience.

An example of a digital key telephone system (DKS) to which the invention is applicable, is sold under the trademark NORSTAR by the assignee, and was available and sold prior to Apr. 12, 1990. In a NORSTAR, a digital key telephone set 125 includes a base having an upper face similar to that illustrated in FIG. 5. The base includes a dial pad 201, a volume control 202, and release and hold buttons 203 and 204. One of the features of the digital key telephone set is that of several so called programmable keys at 206 each of which may be defined for access to a desired function by a user. For example to program a function, a depression of a feature key 205 is followed by a desired dialling action, followed by a depression of one of the programmable keys 206. Thereafter pressing of the key 206 will initiate the user defined function. A display 207 is used to visually indicate how to use NORSTAR features many of which were predetermined either before or upon installation of the system and are available via access buttons 211–220 in accordance with the exemplary illustrated labels. A display 210 visually indicates the activity of each of the respective access buttons 211–220, such indication being presentable next to each of the access buttons. For example, a conference feature on a NORSTAR indicates how to use this feature, via the display 207. When a conference button 215 is depressed, the display tells a user what to do. For example, if a call has not been made, "make call first" is displayed, and if the first call has been made, "make second call" is displayed, etc., until the apparently desired communication is achieved.

In spite of the conveniences provided in the NOR-STAR system, many users continued to be intimidated by what they perceived to be required complex decision making procedures. Users continued to reiterate their wishes for simplicity of operation. It was recognized that users don't want to know what type of system they are using and/or what type of system this system is operating in conjunction with, be it a centrex featured central office or a private branch exchange (PBX). They don't want to memorize access codes or make reference to user guides to figure out how a telephone feature is accessed and used. In accordance with the invention, access to many features, whether provided by a DKS or by way of the DKS in conjunction with a centrex, is unified. The user of the DKS is not required to distinguish and is unaware of the origin of a desired feature. Exemplary of the invention, the key telephone display is caused to instruct a user as to how to use the centrex features in a manner apparently similar to the display of instructions as to how to use the DKS features.

Furthermore, whether it be access to a DKS or a centrex line, or access to a feature, such is intended to be available by user depression of a single key or button without the user having to think as to in which of the systems the feature or line is physically present. For example, if a user wished to activate a call forward feature in a prior key telephone system, the user would have pressed a call forward button that worked only internal with the key telephone system. However, if the user wanted to forward calls to a centrex line, the user would have had to program a separate autodial button of the key telephone set with a centrex activation code, for example (*72). Some users are confused in that they don't know which feature invoking action to take, and hence seldom if ever avail themselves of any of the features.

Figure 5:
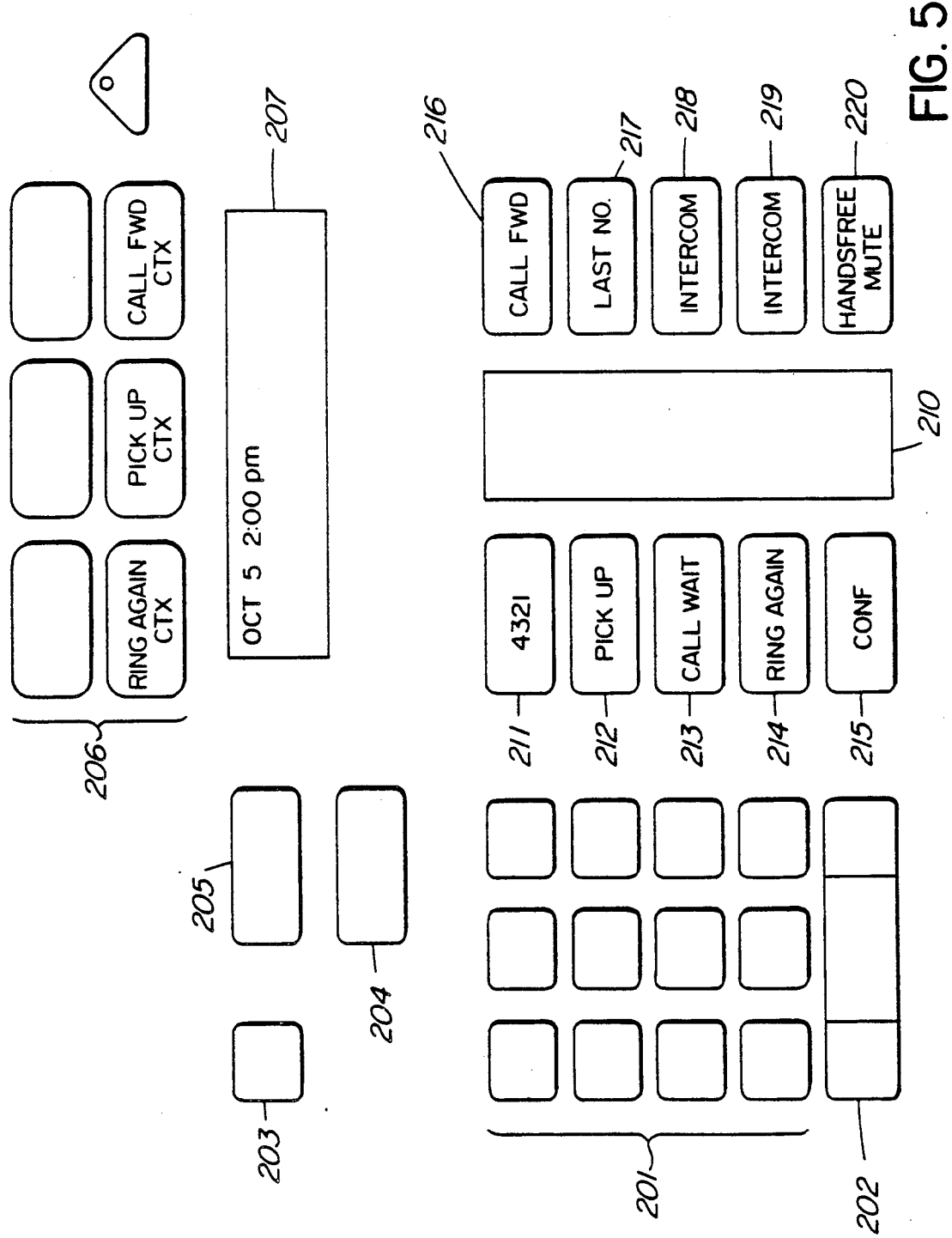
FIG. 5 is a plan view of a portion of a base of a digital key telephone set used with the telephone equipment in FIG. 4.
Figure 6:
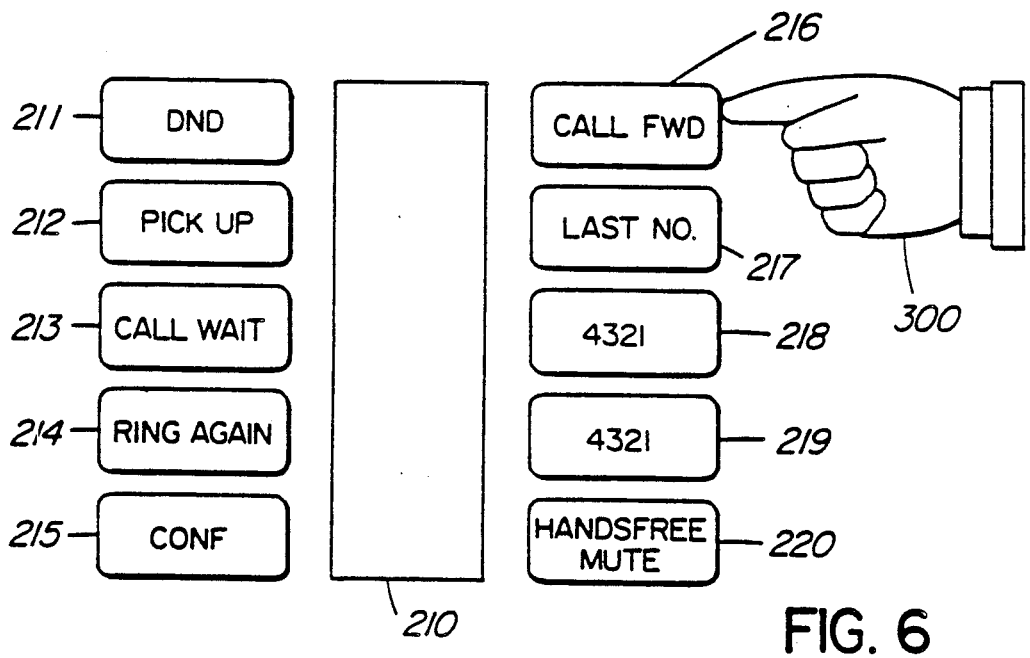
FIGS. 6 and 7 are abbreviated plan views of a portion of the base of the digital key telephone set being operable with ,telephone equipment in accordance with the invention.
Figure 7:
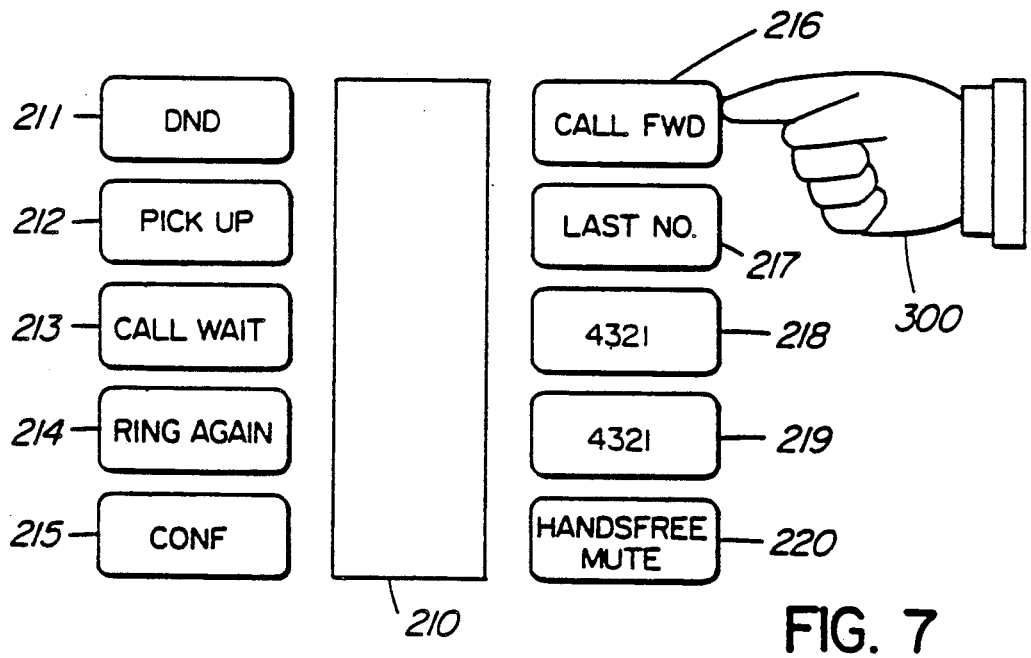

Referring to FIGS. 6 and 7, the base of the digital key telephone set is illustrated in an abbreviated form as compared to FIG. 5, with elements generally common to both being indicated by the same numerical labels. Furthermore in comparison with FIG. 5, illustrated functions of some of the control buttons have been altered for convenience of illustration and description. In FIG. 5, three of the programmable keys 206 are illustrated as having been programmed to provide centrex features of ring again, call pick up and call forward. In the FIGS. 6 and 7, exemplary of the invention, the DKS and the centrex ring again features are combined on the button 214. The call pick up features are combined on the button 212. The call forward features are combined on the button 216, which in FIG. 6 is shown as being pressed by a user 300. When a user invokes the call forward feature, the DKS determines if a telephone number to which the user intends calls to be forwarded is internal to the DKS or outside of the DKS. If the telephone number is internal, the DKS will thereafter connect all calls incoming to the user's digital key telephone set to the intended digital key telephone set, internally. If the intended telephone number is outside of the DKS then an external call forward to the centrex is required. In this case the DKS performs the code generation and signalling required for invoking the intended call forward to the centrex. Thereafter calls which normally would have been directed to the user's digital telephone set are redirected by the central office to the intended telephone set, that is by way of the centrex call forward feature. Thus to invoke the call forward feature the user no longer has to distinguish between the DKS and the centrex.

Figure 8:
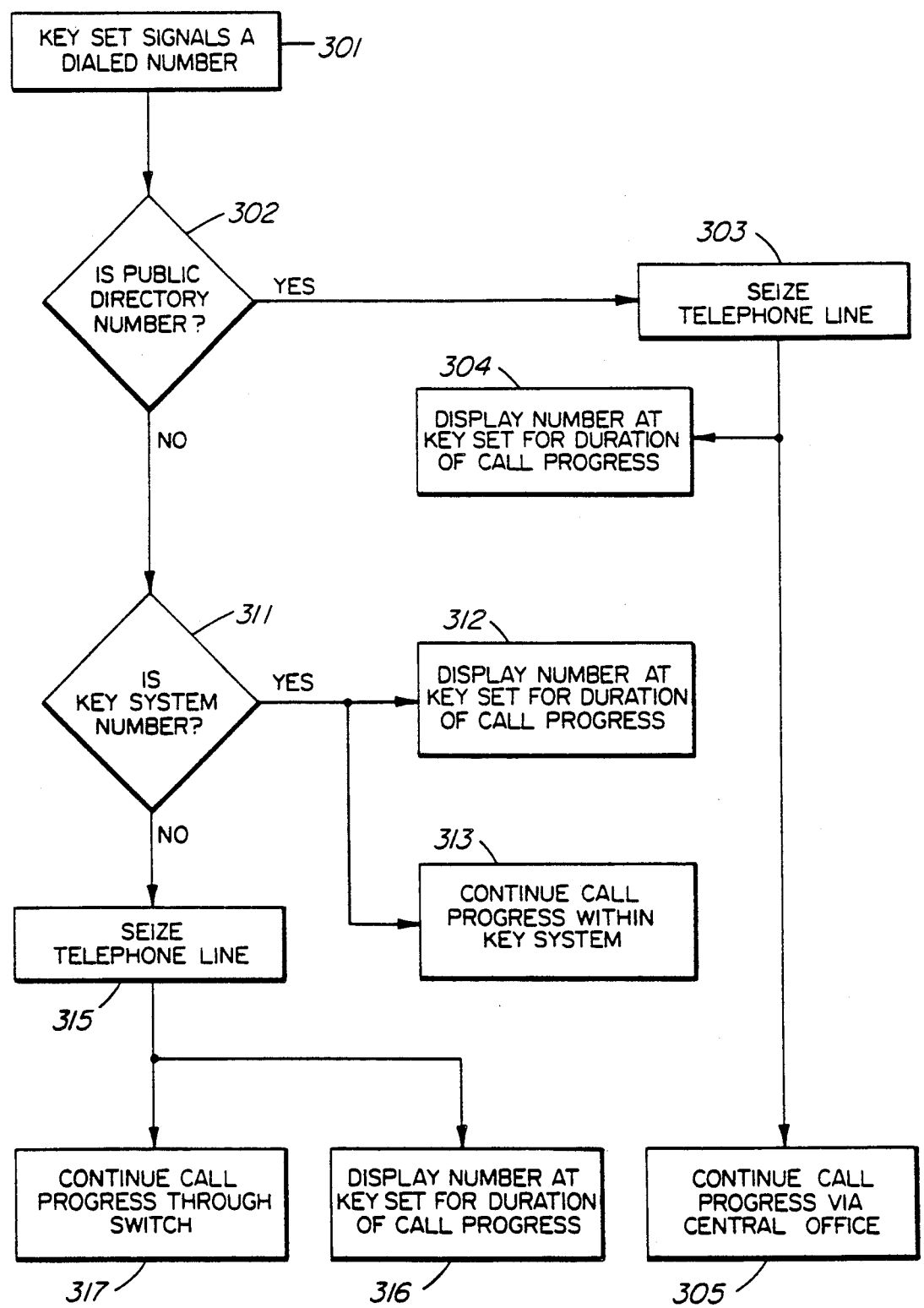
FIG. 8 is a flow chart illustrating a method of operating the telephone equipment, in accordance with the invention, to provide a simplified dialling feature at the digital key telephone set.
Figure 9:
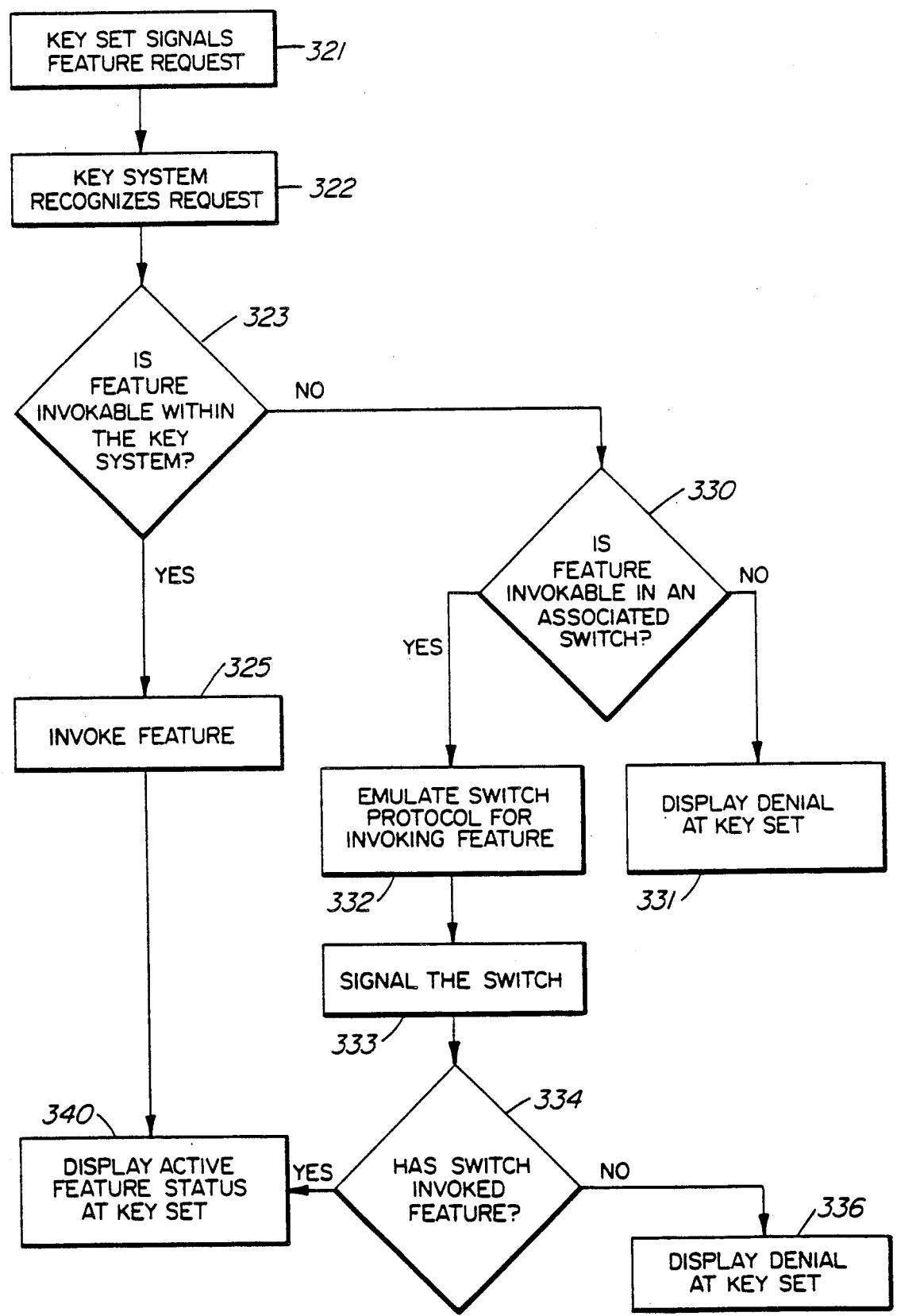
FIG. 9 is a flow chart illustrating a method of operating the telephone equipment, in accordance with the invention, to provide a simplified feature access at the digital key telephone set.

Referring now to the flow charts in FIGS. 8 and 9, the DKS includes emulators as first mentioned in the discussion of FIG. 3 which in accordance with the invention includes an instruction set which makes it responsive to review each dialling sequence and feature key stroke entered by a user of one of the digital key telephone sets. Each of these emulators may reside in the central possessor 7. Alternatively an emulator may be an external feature, resident in an apparatus attached at one of the ports 19. Each dialling sequence and feature key stroke is reviewed with the objective of delivering the call progress or feature access, apparently desired by the user, without the user having to be cognizant of number plans and access feature codes peculiar to a remote telephone system.

In FIG. 8 the flow chart illustrates the method of operation which is executed by the instruction set for the simplified dialling feature in response to a plural digit telephone number being dialled by a user at any one of the digital key telephone sets 125. This instruction set herein after referred to as the simplified dialling feature (SDF) may reside in the central processor 7 or it may reside in an external device arranged to appear as a FUNCTIONAL set. When the user goes OFF HOOK by picking up the hand set or by pressing an extension key, and therefore dials a sequence of numbers at the key pad 201, the digital key telephone set, signals the dialled number, as shown at 301, via its S and S channel. Any dialled number sequence may be a valid directory number in any of the three entities, that is the DKS the centrex, and the public telephone system. The SDF unburdens the user from having to have an intimate knowledge of the structure of these number plans, which the DKS user would otherwise have to know to make telephone calls which use the DKS singly or in combination with one of the other entities.

The SDF examines the dialled number for a presence of at least seven digits, or the first of the digits being a nine, to determine if the dialled number is a public directory number, as indicated at 302. If the dialled number is determined to be a public directory number, the SDF signals activation of the a set's external prime line to the central processor 7, which in turn effects seizure of a central office line, as indicated at 303, on behalf of the digital key telephone set. After a delay normally sufficient to have received central office dial tone, the SDF signals the dialled number on behalf of the digital key telephone set and also signals the dialled number to the digital key telephone set to cause the digital key telephone set to display the dialled number for the duration of the call progress, as indicated at 304.

Thereafter the call progress continues under the control of the central office, as shown at 305.

If the SDF determines that the dialled number is not a public directory number, a system directory number plan administration data base is examined to determine if the dialled number is within the DKS, as shown at 311. If so the SDF activates one of the digital key telephone sets extension buttons, causes the dialled number to be displayed at the digital key telephone set, as indicated at 312, and signals the dialled digits on behalf of the digital key telephone set whereby the call progress continues within the DKS, as indicated at 313.

If at 311 the SDF fails to confirm the dialled number to be either a public directory number or a number within the system directory number plan administration data, the SDF assumes by default that the dialled number is within the directory number plan of the centrex or of a PBX, as the case may be. In this case the SDF signals activation of the digital key telephone set's external prime line to the central possessor 7, which in turn effects seizure of an external line, as indicated at 315, on behalf of the set. After a delay normally sufficient to have received centrex or PBX dial tone, the SDF signals the dialled number on behalf of the set and also signals the dialled number to the digital key telephone set to cause the digital key telephone set to display the dialled number for the duration of the call progress, as indicated at 316. Thereafter the call progress continues under the control of the external switch, as shown at 317.

Although the simplified dialling feature permits dialling without the requirement of having to first select a line appropriate to the physical destination of the call, the progress tones of the various entities involved during each telephone progress are applied as they are appropriate and are audible to the user as intended. As these tones may have characteristics which are distinct with respect to their sources and the DKS, it is realized that such distinctness may be confusing for some users, and therefor as another feature it is envisaged that such tones be intercepted, and recognized, so that corresponding DKS progress tones, may be generated for audible indication to the user. One example of progress tone detection is disclosed by C. T. Cheng in U.S. Pat. No. 4,528,664.

In FIG. 9 the flow chart illustrates the method of operation which is executed by the instruction set for the simplified feature access (SFA) from the digital key telephone set. In an event of a feature request having been entered via a keystroke at a user's digital key telephone set, followed by a number sequenced having been pressed at the dial pad 201, the feature and the number sequence are signalled via the S and S channel of the set, as indicated at 321. The DKS recognizes the feature request as being different from a typical telephone call, at 322, and makes use of routines similar to those as previously introduced in steps 302 and 311, in FIG. 8, to determine if the requested feature is invocable in relation to the user's digital key telephone set and the dialled number sequence, as indicated at 323. For example if the dialled number sequence is found to be within the system directory number plan administration data base at 323, then the SFA causes the feature to be invoked in a manner as normally performed by NORSTAR when first introduced for sale by the assignee, as indicated at 325 and at 340 in FIG. 9.

If the sequence of dialled numbers is found not to be within the system directory number plan administration data base, and is found not to be a public directory number, it is assumed that the sequence of dialled numbers relates to a directory number of the associated centrex or PBX. In this case a translation table is referred to by the SFA to determine the appropriate feature code for invoking the corresponding feature in the associated switching facility. As indicated at 330 if an appropriate feature code is not available, denial of the feature is signalled to the user's digital key telephone set, where it is displayed, as shown at 331. If the feature code is available, the SFA causes an appropriate telephone line to be seized. After a time normally sufficient for dial tone to be delivered by the associated facility, the DKS signals the feature code and the sequence of dialled numbers in the signalling protocol of the associated facility, as indicated at 332 and 333 in FIG. 9. In this embodiment, there is no provision for machine recognition of the successful invocation of the feature by the associated centrex, and thus invocation of the feature is assumed and so indicated to the user's digital key telephone set by the SFA. However it is envisaged that appropriate confirmation or denial signalling from an associated facility will be detectable for use as indicated at 334 whereby feature denial can be displayed at the user's digital key telephone set as indicated at 336, when practical cost permits.

The operation of the DKS is discussed in more detail from the point of view of users of the digital key telephone sets 125A and 125B and in relation to the telephone set 112C in FIG. 5, which hereinafter are referred to as set A, set B, and set C, respectively.

In a utilization of SFA, if the user 300 of set A wishes to invoke a call forward, set A to set B, the user 300 presses the call forward button 216 on set A as in FIG. 6, and then presses the dial pad digits identifying set B, that is the DKS directory number (4322). The display 207 indicates the call forward feature and the directory number as shown in FIG. 7. The same principle applies if the user wishes to invoke a call forward, set A to set C, that is a telephone set outside the DKS, via the centrex. In this case the user 300 pushes the call forward button 216, and then presses the digits for set C, that is the centrex directory number (4323) In-either instance, as shown in FIG. 8, confirmation that the call forward feature is invoked is indicated by the display 210, next to the call forward button 216, and a "CANCEL" instruction in the display 207 indicates that the call forward feature can be cancelled by another depression of the call forward button 216.

In the past, NORSTAR users on centrex had to decide if the call to be made was an intercom call, that is a call within the DKS, or if the call to be made was a centrex call, that is a call outside the DKS but inside the centrex. The user 300 of set A for example, was faced with the option of pushing one of two buttons to make a call. Sometimes the user was confused as to which button to push to make a call. Referring to FIG. 5, the user can push the so called intercom button 219 to make calls internal to the DKS, or push a line button 211 to make an external centrex call. Therefor the user had to know if the intended called party was served by the NORSTAR or by the centrex featured central office. This distinction is sometimes not readily apparent to the user.

Exemplary of the invention, an extension button 219 is provided, as illustrated in the FIGS. 6 and 7, with the functionality of the line button and intercom button. Accordingly the user 300 may push the extension button 219, and thereafter press the digits of the called number whether or not the called party is served directly by the centrex or the DKS, without having to have the knowledge that the call should be routed internal to Norstar or external into the centrex.

As discussed in the forgoing, in situations where a DKS is connected to a centrex, it is desirable to give the users of the DKS the features of;
 (a) simplified dialling, for calling other DKS and centrex users; and
 (b) simplified feature access, for conveniently invoking DKS features and centrex features, without the user having to distinguish between the two systems. However having regard to the often limited resources key telephone customers are willing to commit to acquisition of key telephone apparatus, it was apparent that any additional associated expense in a NORSTAR would be difficult for the customer to tolerate.

The original signalling interface between a NORSTAR and a centrex is the North American standard dual tone multifrequency (DTMF) telephone set interface. This is sometimes referred to as the 2500-set interface and it was determined to be the most convenient on the basis that it was about the most economical standard to interface the DKS. Hence as originally sold, a NORSTAR was not provided with any capability to detect any other tones, as may be generated by the central office, such as dial tone, special dial tone, confirmation tone, and reorder tone, for example. Furthermore the central office is not expected to provide any additional DTMF signalling as would be convenient to inform the Norstar of the centrex feature's call states, feature status, readiness for input, reaction to feature invocations, and centrex call identification data. These various informations would be of benefit in a foolproof implementation of the DKS features of simplified dialling and simplified feature access, however it has been demonstrated that in the price competitive market place these features are attractive only if providable solely by means of software, that is without the provision of additional or special hardware and without any modification of the standard interface with the central office. Therefor the example embodiment of the invention is susceptible to failure to function as a user might expect from time to time, particularly when the operational state of the centrex is other than that assumed by the DKS from a sequence of preceding events. However it is believed that the operational convenience experienced by the typical user far outweighs any disadvantage of an occasional functional failure, which may often be overcome by the user simply starting over again.

EXTENSION KEYS

Previously a digital key telephone set in a Norstar included at least one intercom button 219 and at least one external line button 211 as shown in FIG. 5, to present these two types of calls. In the present example, calls to and from digital key telephone sets and calls to and from other than DKS sets are presented on a single type of line key, herein referred to an extension key. The extension keys 218 or 219, in FIG. 6, are used for both types of calls. However this does not preclude the digital key telephone set from having an external line key designated in the digital key system administration data (DKSAD) as corresponding to a specific centrex line.

EXTRA LINE KEYS

A single centrex line or alternatively a centrex line pool may be designated in the DKSAD as a set's external prime line. This line or line pool is associated with any extension key or keys which a digital key telephone set may have, for purposes of automatic external line selection and external line status indication, on the display 210. In cases where the user wishes to have access and/or view the status of more than one centrex line, additional lines may be assigned as extra lines. Each assigned extra line occupies one key on the digital key telephone set. An extra line key is used to represent only the specific external line associated with that key. The existence of extra lines allows a user to have private lines, to have multiple lines appearing and ringing at attendant positions, and to monitor the 'busy status' of a centrex set. Like extension keys, extra lines keys allow the user to select a line in order to retrieve a call placed on hold at another set, or to join into a call on a line, providing that a privacy feature is not in effect. Extra lines keys also make it possible to monitoring the activities of any 1A2 key telephone lines which may be served by the centrex.

TYPES OF DIRECTORY NUMBERS (DNs)

The software in the DKS enables the system to interpret each sequence of digits dialled by the user as being one of either an internal DKS directory number (DN), internal centrex DN, or an outside DN. This distinction allows the DKS to act appropriately when the user dials a number or invokes a feature such as call forward. In this example if the dialled number is neither an internal DKS DN or an outside DN, the dialled number is assumed to be an internal centrex DN. In the DKSAD all of the internal DKS DNs are explicitly designated as DKS only DNs. Generally dialled number sequences of more than five digits or those beginning with a predetermined digit are assumed to be outside DNs, while any other dialled digit sequence not within these two groups are assumed to be a centrex DN. However this does not preclude the designation of any particular number sequence from being stored as an individual specific record in the DKSAD.

In many cases, the DKS checks for the existence of a prime centrex line before initiating a centrex call to that set or activating a centrex feature related to that set. However, the DKS does not automatically alter the administration value of a digital key telephone set's DN type based on the presence or absence of a prime centrex line. If a particular set does not have a prime centrex line having a centrex DN which matches the DKS DN (e.g. if the set has no prime line, or if its prime line is a line pool), the set's DN type is administered as an internal DKS only DN, so that the DKS will not attempt to access that particular set by way of the centrex.

In some cases, the DKS is arranged to distinguish between DNs that specify destinations within the centrex system, and those that specify destinations beyond the centrex system. This distinction is based on specifications in the DKSAD, and identifies a predetermined prefix digit or digits as meaning 'dial outside the centrex system' and it is particularly useful where an indefinite number of dialled digits are required. This is one example of means by which the simplified access to features such as call forward, transfer immediate, and transfer with announcement for destinations outside the DKS and outside the centrex, may be implemented.

SIMPLIFIED DIALLING

Simplified dialling applies to calls initiated either manually or by any automatic dialling feature. In order to simplify dialling for the user, the DKS determines whether a user-dialled DN refers to a DKS or a centrex destination, and routes the call appropriately. If the user initiates a call to a DKS DN, the result is an internal DKS call. This call uses an extension key at the originating digital key telephone set, as will be displayed next to the button 219 in FIG. 6 for example. If the user initiates a call to a DN within or beyond the centrex, the call is presented on an extension key or an appropriate extra line key, as will be displayed next to the appropriate key. However in this case, the DKS selects a centrex line and DTMF signals the dialled digits on that line. Similarly, any attempt to initiate a voice call is directed to the appropriate system. For example an attempt to make a voice call from a digital key telephone to a centrex telephone set results in the DKS placing a normal centrex ringing call to the destination on behalf of the user. Furthermore a transient message "+No voice call" is presented on the display 207.

GENERIC DIAL TONE

In an event that an idle extension key or an idle extra line key is pressed, rather than seizing an actual external line the DKS merely delivers its generic dial tone. Hence the user hears the DKS generic dial tone rather than a central office supplied dial tone. Only when the user dials a directory number sequence that is recognized as being external to the DKS will the system attempt to seize an associated external line and subsequently DTMFs the digits on that line. Of course in this example the DKS has no means by which it may recognize a central office or PBX dial tone, and therefor it merely pauses for a moment which is usually sufficient for the central office dial tone to have been delivered. If a user goes OFF HOOK by picking up the hand set (not shown) while the digital key telephone set is idle, the DKS selects an idle extension key 218 or 219, provides the appropriate indication on the display 210 and provides the DKS generic dial tone. As in the case of actual selection of an idle extension key there is no connection with an actual external line, at this moment.

GENERIC DIALLING STATE

If the user receives generic dial tone after having pressed an extension key or extra line key and then proceeds to dial, the digital key telephone set remains in generic dialling state until the DKS determines whether the destination is within or beyond the DKS. That is, seizure of an external line is attempted only if the user dials a digit that is not part of a valid DKS DN group.

DIVIDING A CENTREX LINE

In some situations, the system responds to a second call by dividing an active centrex line to accommodate the second call. This occurs if the user, having initiated or answered a non-Norstar call, initiates a second non-Norstar call which uses the same line, or answers a waiting call on the same line. In these situations, the centrex system imposes some restrictions on the user's ability to manipulate the divided line. For example, if the line is divided by an outgoing call, the centrex system allows the user to conference the two calls, transfer one to the other, or drop the second call and return to the first, but does not allow the user to return to the first call without dropping the second call. If the line is divided by an incoming call, the centrex system allows the user to alternate between the calls, but does not allow the user to conference or transfer them.

SIMPLIFIED ACCESS FEATURE

Each feature in the DKS is available to the user by a single key or feature code access with which to invoke that feature. Those of the features which are substantially the same as features also available in the centrex are available simply by the user performing the same access action, with no requirement for the user to decide which system needs to be addressed. At least one feature not provided in the DKS, that of "Make Busy", which is provided in the centrex, is available at the user's digital key telephone set via one of the keys so designated in the DKS administration data base. The SFA causes the DKS to invoke the feature automatically, based on the telephony context and in some cases a user specified DN.

FEATURES SUPPORTED VIA SFA

Examples of features supported in the DKS via the SFA are as follows:

A/ Call Manipulation Features
    Transfer Immediate
    Transfer with Announcement
    Call waiting
    Three-way Conference
    Consultation
B/ Digital Key Telephone Set Status Features
    Make Busy (centrex feature only)
    Call Forward
C/ Call Completion Features
    Priority Call/Executive Busy Override
    Call Pickup - Group
    Call Pickup - Directed
    Ring Again The main mechanisms required for simplified access are:

decisions generated by the SFA as to in which system to invoke a feature, based on the telephony context and/or a specified destination;

an integrated DKS numbering plan, allowing the DKS to direct the feature to the appropriate system, based on the DN supplied by the user requesting a feature invocation; and an ability of the OHS to send appropriate codes, for example centrex feature activation codes to a centrex featured system.

To achieve operation of the SFA as hereinbefore discussed, it is preferable, that the directory number plan be so arranged that each digital key telephone set's DN matches the centrex DN of the digital key telephone set's prime line. The directory number plan is a part of what is typically referred to as a system administration specification. Some of the previously introduced features make use of the system administration specification of the prefix digit(s) that initiate calls beyond the centrex system. Furthermore it is essential that the installer of the DKS arrange for the DKS administration specification to include the '2500' telephone set feature codes expected by the host centrex.

CENTREX FEATURE AVAILABILITY

In general, any of the previously noted features can be performed on any centrex line, however the centrex line must be in the appropriate state. Call forward, make busy, and ring again may each be invoked only with respect to a prime or other external lines explicitly assigned to the digital key telephone set in the DKS administration data. That is, these features cannot be applied to a line obtained indirectly by exercise of a DKS feature, for example call transfer.

The DKS is not able to invoke a centrex feature unless the corresponding feature code exists in the centrex feature code table in the DKS administration data.

FEATURE ACTIVATION ON LINES NOT ASSIGNED TO THE DIGITAL TELEPHONE SET

The DKS supports the activation of centrex features only on lines which are assigned to the digital key telephone set in the DKS administration data. For example, if the user obtains a line from a line pool, and the line obtained is not assigned to the user's digital key telephone set, then an attempt to activate any of the centrex dependent features such as ring again, call forward, and make busy, will fail.

AUTOMATIC EXTERNAL PRIME LINE SELECTION FOR FEATURES

Using a typical 2500 telephone set connected directly to a centrex, a user must obtain dial tone from the central office before invoking a feature such as call forward, make busy, or call pickup. In contrast in the DKS, if a set's prime line is a specific centrex line, there is no need for the user to obtain the central office dial tone before invoking a centrex feature on the prime line. The DKS selects the centrex line, when appropriate.

FEATURES NOT SUPPORTED VIA THE SIMPLE FEATURE ACCESS

Not all user invocable NORSTAR features having centrex equivalents are available through the SFA. That is in some examples of a NORSTAR and centrex combination the digital key telephone set user must yet distinguish programmed keys or dial different access codes in order to invoke the NORSTAR and centrex versions of each of these features. Some of these features are as follows:
call park,
hold,
night service activation,
page—speaker,
send message,
speed dial activation, and
trunk answer from any station set.
However, it is envisioned that upon a future adaptation of a more sophisticated DKS/centrex signalling protocol, that some of these feature will be supportable via the SFA.

USER DIALLING OF CENTREX FEATURE CODES

The SFA in a Norstar is arranged to recognize codes dialled manually or previously programmed dialled by the user which relate to a function of another telephone system, for example a feature code for a centrex, and does not attempt to perform any emulation function. Hence the more sophisticated user is able to bypass the SFA by dialling the appropriate centrex codes directly, if desired. For example, if the user can invoke the call forward feature in centrex by dialling the centrex call forward feature code manually, instead of using the Norstar feature code or pressing the appropriate key. However in this case the status of the centrex feature so invoked is not assumed by the DKS and hence no indication of call forward status is given at the user's digital key telephone set.

ASSUMPTIONS CONCERNING CENTREX LINE ACCESS

Recently it appears that in 90 to 95% of the NORSTAR installations, there is likely to be at least one centrex line assigned to each digital key telephone set. In some cases, a set will have more than one centrex line assigned to it, to provide greater incoming and/or outgoing calling capacity than would be available with only one centrex line. Some users may require appearances of another sets' centrex lines, for call answering purposes. Sharing of outgoing centrex lines has been found to be rare, however provision for such sharing is supported by the DKS as described later.

ASSIGNMENT OF EXTENSION KEYS AND PRIME LINE

In the DKS, a digital key telephone set can be assigned a specific centrex line or a line pool as its prime line, or it may have no prime line assignment whatsoever. An external line must be assigned to a set before it can become that set's prime line. The prime line is associated with the digital key telephone set's extension keys. The digital key telephone set does not use an extra line key for its prime line. This approach avoids user confusion about the difference between two types of keys bearing the same line designation. For convenience by default, the single centrex line which is automatically assigned to each set is that set's prime line.

For example, following a DKS start up, a first set with a DN 2221 would be assigned with line 1, a second set with a DN 2222 would be assigned with line 2, and so on to a limit based on the size of the DKS. In a small DKS, lines 1 to 8 would be assigned in ascending order to sets with DNs 2221 to 2228. In a larger DKS, lines 1 to 56 would be assigned in ascending order to sets with DNs 2221 to 2276. Hence an installer who understands these automatic line assignment and prime line designation rules, can connect the digital key telephone sets in sequence at the ports 19 such that each digital key telephone set receives the desired centrex line. This may eliminate the need for manual administration to associated each set with its corresponding line. However manual administration is always available.

Only one centrex line or line pool can be associated with the extension key on a given digital key telephone set. As mentioned earlier, if the user requires direct access to more than one centrex line, additional lines may be assigned to extra line keys. When a specific centrex line is assigned to a digital key telephone set as its prime line, that line will attempt to ring the set by default, unless specified as 'no ring' in the DKS administration data.

If no prime line is assigned to a digital key telephone set, or if the prime line is a line pool, external calls will not ring at the digital key telephone set directly, except in the case where the digital key telephone set has one or more extra line keys specifically administered to ring. Also, the same centrex line can be assigned as the prime line on more than one digital key telephone set although it appears that this is seldom required by the customer.

MATCHING DKS AND CENTREX DNS

When a specific centrex line is assigned to a digital key telephone set as its prime line, the installer should administer the digital key telephone set's DKS DN to be the same as the DN of the prime centrex line assigned to the set. This allows callers to dial the same number to call this set from inside or outside the DKS. The convenience derived by this form of DN administration is emphasized.

USE OF EXTENSION KEYS

Extension keys in the DKS are similar to intercom keys in the prior Norstar system implementations, in that an extension key is used to represent any call that appears on the digital key telephone set (including calls resulting from features such as call forward, call pickup, and transfer), except in the case where the user's digital key telephone set has an extra line key corresponding to the external line on which a call appears. Extension keys are also used to represent any centrex call appearing at the digital key telephone set, including the second call on a divided centrex line.

RULES FOR EXTRA LINES

Extra lines are compatible with the simplified dialling feature. For example pressing an idle extra line key turns on the associated display indicator and provides DKS generic dial tone, but does not actually select the centrex line. If the user presses an extra line key and dials a DKS DN, an internal call is initiated. The call indication moves from the extra line key to an extension key and a transient message "NORSTAR call" is presented in the display 207. At this point, the extra line key indicator becomes available to show the ongoing status of the centrex line which it represents.

If the user presses an extra line key and then dials a line pool access code, the DKS may select a centrex line not associated with that extra line key. In this event the initial call indication displayed at the extra line key by the display 210 is subsequently displayed at an extension key.

When there is only one external call on an extra line (i.e. the line is not divided), that call is displayed at the extra line key. In the presence of the call waiting feature, an occurrence of a second call will cause the second call to be indicated at an extension key. If the user then selects the original call by pressing the extra line key and operates the release button 203 to releases the first call, the display indication of the second call moves from the extension key to the extra line key. In this situation, the transient message "Call moved" is displayed in the display 207 and the indication at the extra line key is flashing to show that the call is on hold.

If the user presses an extra line key and dials a DKS DN when there is no idle extension key available to represent the call, the DKS removes the accompanying extra line key indication, and displays a transient message "Release a call", accompanied by a sounding of an error tone. If the user continues to wish to make the internal call, the user must release an extension key and then repeat the previous call attempt.

LINE STATUS INDICATION ON EXTENSION KEYS AND EXTRA LINE KEYS

If a digital key telephone set's prime line is a predetermined specific centrex line, the status of this line is shown on an extension key whenever possible. However in some cases, no extension key is available for this purpose. This situation arises when all digital key telephone set's extension keys are already in use for other calls not associated with the prime centrex line. These calls may include outgoing or incoming internal calls, and/or calls redirected from other sets, and/or a call in generic dial tone or generic dialling state. In these situations, when an extension key does become available, the DKS turns the indicator 'off' for a period of about one second. If the user selects the key during this one-second period, the indicator turns 'on', the user receives generic dial tone, and the state of the external line is not shown. However if the user does not re-select the extension key within one second, the software presents the centrex line state—idle, alerting, active, or hold in association with the extension key.

Similarly, an Extra Line Key on a set shows the actual status of the associated external centrex line whenever possible. If the user selects the key when the external line is idle, and is in either of the generic dial tone or the generic dialling state, the associated external centrex line may start alerting, or may be selected by another digital key telephone set. The state of the associated external centrex line cannot be indicated at this moment. As in the extension key case, when the user releases an extra line key, the indicator is turned 'off', and if the user does not re-select the extra line key within about one second, the associated external centrex line state is presented on the extra line key.

Line status indications provided at the extension keys and at the extra line keys support activities such as retrieving a line held at another set, selecting a line on which privacy has been released, and monitoring the status of the line to know when another set has finished using it, for example. However line status indications at these keys do not include the indication of status of lines in a line pool.

In a case where a digital key telephone set's prime line is any line in a line pool, and the user wishes to be informed that an idle line is available from within the line pool, the digital key telephone set must be provided with a key designated as line pool, within the group of buttons 211-220. An extension key is not used to show whether or not there is a line available in the line pool. This is referred to as a 'line pool busy' feature and it allows the user who has a line pool key to have an indication at the line pool key of whether or not there is an available line in the line pool.

'LINE IN USE' SITUATIONS

An attempt, to use either of a prime centrex line, or an extra centrex line, for a manual or an automatic call initiation, or for a feature activation or deactivation, will fail, if the line is already busy, as is the case if the line is alerting or is in use at another digital key telephone set. A user's prime centrex line may be in use at another digital key telephone set in the event of any of the following listed conditions:

another user has used the DKS call pickup feature to answer the line;

another user has used the DKS retrieve park feature to connect to a line after a call has been parked on it;

a second user was included in a conference with that line, and remains connected when the (prime line) first user drops out;

the prime line rings and is answered at another digital key telephone set because of exercise of a DKS call capture feature, for example any of, delayed ring transfer, trunk answer from any station, night service ringing, call forward all calls, call forward no answer, or call forward busy;

a user for whom the line is prime, transfers it to a DKS-only DN; and in an installation where line sharing exists, the line is selected at another digital key telephone set.

As before mentioned line sharing installations are rare, and in such installations the prime external centrex line will be unavailable during the progress of any of the following listed events:

the line alerts and is answered by operation of an extension key, an extra line key, or an answer key, at another digital key telephone set;

a centrex call or feature is in progress on the prime external centrex line, said progress having been invoked at an extension key or at an extra line key on another digital key telephone set, or having been invoked via access to a line pool; and the line is transferred through the hold feature by having been picked up at an extension key or at an extra line key on another digital key telephone set.

When a line is unavailable at one digital key telephone set because it is in use at another digital key telephone set, an "In use: <name>" message is presented on the display 207 at the one set. The message displayed includes the name of the user associated with the other set. When a line is unavailable for other reasons, the message "Line in use" is displayed. The user attempting to access an unavailable line for call initiation or feature activation/deactivation receives indications as follows. If the line is already receiving generic dial tone, an error message "In use: <name>" or "Line in use", is displayed and accompanied by a reorder tone at the digital key telephone set. The reorder tone persists until the user takes an action to discontinue the call attempt. In other situations,- a message "In use: <name>" or "Line in use", is displayed, accompanied by an error tone. The message is displayed for a short time after which a message appropriate to the user's current call processing state is presented on the display 207 of the digital key telephone set.

NO PRIME LINE ASSIGNED

An attempt to initiate an external call from a digital key telephone set will fail if the prime line specification for the set in the DKSAD is 'None'. In this situation, an attempt to dial an external call results in a message "Denied in admin", being displayed. If the user is receiving generic dial tone, this message, is accompanied by the reorder tone. In other cases, the message is accompanied by the error tone.

CENTREX DIAL TONE

Pressing an extension key or an external line key results in an apparent line access as will be audibly indicated by DKS generic dial tone. The DKS does not select the centrex line until the user takes an action which requires DTMF signalled on the centrex line. At this point, the DKS selects the line, and mutes the receive audio path while DTMF signalling on the line. Thus, the user does not actually hear the dial tone from the centrex line.

There is at least one situation in which a user may wish to obtain dial tone on a centrex line. This is the case where the centrex system, or a messaging system connected to centrex, uses 'stuttered dial tone' as a message waiting indication. In a DKS connected with a centrex system, as described in the preceding paragraph, the user will not receive this 'passive' message waiting signal when going offhook. However, the user can press a programmed key to check for messages. To overcome this problem the user may program one of the keys 206 to provide an external autodial feature containing a link feature code (F71). The button may be physically marked with any convenient label for example 'Check Msg'. When the user presses this key unmuted centrex dial tone 41 will be heard and if it is 'stuttered' a message waiting is indicated.

CONCENTRATION AND SHARING OF CENTREX LINES

As mentioned earlier, the same centrex line can be assigned as the prime line on more than one digital key telephone set. This allows multiple digital key telephone sets to share the same centrex line for incoming and outgoing calls. Only one of these sets can be administered such that its prime DKS DN matches the centrex DN. However, an answer key feature can be used to force the remaining digital key telephone sets to ring for calls to this DN. As mentioned earlier, the status of the centrex line is presented on an extension key whenever an extension key is available for this purpose. Assignment of the same prime line to more than one set increases the possibility that the user may dial an outgoing non DKS call and then receive an "In use:<name>" message because the line is already in use at another digital key telephone set. To simplify DKS administration, a ringing line preference may be selected as 'ring', in the DKS administration data, for all sets having the same line assigned as a prime line.

As before mentioned connection of a digital key telephone set with the centrex may be by way of an external line having been momentarily assigned from a line pool. The user can obtain an outgoing line from a desired line pool by pressing an extension key and dialling the access code for that line pool, by pressing a key programmed to access the line pool, or by assigning a line pool as the digital key telephone set's prime line. However the simplified dialling feature is not available via a line obtained from the line pool. Any digits dialled at the digital key telephone set are sent out as DTMF signalling by the DKS on the actual external line, with no analysis of the contents by the DKS.

IMPLICATIONS OF SHARING CENTREX LINES

The sharing of centrex lines by two or more digital key telephone sets may detract from the functionality of some of the centrex features. For example, if a user invokes the call forward feature and causes a centrex line to be forwarded, the call forward feature applies as well for that line on all the other digital key telephone sets. Similarly, if a user invokes the ring again feature on a centrex line, for example in response to a called party being busy, this may cancel another user's previously invoked ring again feature on that line. When the centrex ring again offer is made, the DKS will ring all the digital key telephone sets which have that centrex line designated as a prime line or as an extra line administered to ring. However this problem is avoidable providing that each of the digital key telephone sets has an exclusively assigned prime line and providing that the simplified features access feature is restricted to prime line usage in every instant of involvement with a centrex provided feature.

DISPLAY OF 'CENTREX FACILITIES' SYMBOL

When an outgoing call or feature invocation accesses facilities in the centrex, rather the DKS, this fact is signalled to the user by a special 'centrex facilities' symbol in the first position of the display 207. This symbol is intended to remind the user that some limitations to functionality or status indications may exist. This may help the user to understand differences in the operation of features such as Ring Again, Send Message, and Priority Call when activated on a DKS destination and on a centrex destination. The currently implemented 'centrex facilities' symbol is a plus sign in inverse video (white on a black background).

We claim:

1. A method of signalling and supervision communication in a key telephone system having a central processor, a first plurality of ports, each of which is available for connection of a telephone line of a telephone switching facility, another plurality of ports, each of which is available for connection of an apparatus thereto, each port connected apparatus including an interface device for exchanging signals with the port in an operating signal format of the port, and means associated with the first plurality of ports for translating between a signalling and supervision format of the telephone line and the operating signal format of the other ports, the method comprising the steps of:

recognizing a message, from a port connected apparatus, of a context wherein access to a telephony feature is specified;

determining the specified feature to require participation of the telephone switching system;

emulating a feature access protocol of the telephone switching system in response to the context of the message; and signalling the emulated feature access protocol via the telephone line, whereby a user of said port connected apparatus may be availed of a feature of the telephone switching system.

2. A method of initiating a call progress in a key telephone system having a first plurality of ports, each of which is available for connection of a telephone line of a telephone switching facility, another plurality of ports each of which is available for connection of an apparatus thereto, each port connected apparatus including an interface device for exchanging signals with the port in an operating signal format of the port and means associated with the first plurality of ports for translating between a signalling and supervision format of the telephone line and the operating signal format of the other ports, the method comprising the steps of:

a) signalling a dialled number at one of the apparatus, b) recognizing the dialled number to be in a number plan of the key telephone system and continuing the call progress within the key telephone system; and if the dialled number is not recognized, c) seizing a telephone line and continuing the call progress through the telephone switching facility.

3. A method of initiating a call progress as defined in claim 2 wherein the telephone line is one of a group of special lines for which PBX functionality is available, wherein following step a), the method further comprises:

i) recognizing the dialled number to be a public directory number, ii) seizing a telephone line and continuing the call progress via a central office exchange, and if the dialled number is not recognized as a public directory number continuing with step b).

4. A key telephone system comprising a central processor, a first plurality of ports each of which is available for connection to a telephone line of a telephone switching facility; another plurality of ports, each of which is available for connection of an apparatus thereto; each port connected apparatus including an interface device for exchanging signals with the port in an operating signal format of the port; means associated with the first plurality of ports for translating between a signalling and supervision format of the telephone line and the operating signal format of the other ports; and further comprising means for recognizing a message, from a port connected apparatus wherein the message is of a context which specifies access to a telephony feature, means for determining if the specified feature requires participation of the telephone switching system and for providing an indication of same; means for emulating a feature access protocol of the telephone switching system in accordance with the context of the message and in response to the indication.

5. A key telephone system comprising a central processor, a first plurality of ports each of which is available for connection to a telephone line of a telephone switching facility; another plurality of ports, each of which is available for connection of an apparatus thereto; each port connected apparatus including an interface device for exchanging signals with the port in an operating signal format of the port; means associated with the first plurality of ports for translating between a signalling and supervision format of the telephone line and the operating signal format of the other ports; and further comprising:

means for recognizing dialled numbers to be in a number plan of the key telephone system, and for indicating an occurrence of a dialled number to be other than in the number plan; and means for causing the dialled number to be signalled via a telephone line in response to the indication.

6. A key telephone system as defined in claim 5 wherein the telephone line is one of a group of lines for which PBX functionality is provided, the key telephone system further comprising:

means for indicating a dialled number to be one of a plurality of public directory numbers, and means responsive to the indicating means, for causing the telephone line to be seized, whereby the call progress may continue via a central office exchange.

7. A key telephone system comprising:

means for providing communications paths between any of a plurality of key telephone sets and between any of the plurality of key telephone sets and selectable ones of telephone line interfaces for connection to telephone trunk lines associated with a telephone exchange;

means for recognizing an attempt by a user of one of the plurality of key telephone sets to access a telephony feature foreign to the key telephone system but otherwise implementable by way of the telephone exchange;

means for seizing one of the line interfaces and causing one of said communication paths to be provided between the key telephone set and the seized line interface; and means for emulating signalling of a protocol of said associated telephone exchange and transmitting the signalling via the seized line interface, on behalf of the one key telephone set, whereby the telephony feature is invoked at the telephone exchange.

8. A key telephone system comprising:

means for providing communications paths between any of a plurality of key telephone sets and between any of the plurality of key telephone sets and selectable ones of telephone line interfaces for connection to telephone trunk lines associated with a telephone exchange;

examining means for recognizing signalling representative of an apparent intent of a user of one of the plurality of key telephone sets to initiate a call progress to a telephone set connected to the telephone exchange, but which has been dialled by the user as if the telephone set were one other of the key telephone sets;

means for directing one of said communications path to be provided between said one key telephone set and one of the telephone line interfaces; and means for signalling the dialled number to the telephone exchange on behalf of the user, whereby the call progress may be completed by the telephone exchange.

9. A method of operating a key telephone system, the key telephone system including a central processor, a first plurality of ports, each of which is available for connection of a telephone line of a telephone exchange, another plurality of ports, each of which is available for connection of an apparatus thereto, each port connected apparatus including an interface device for exchanging signals with the port in an operating signal format of the port, and means associated with the first plurality of ports for translating between a signalling and supervision format of the telephone line and an operating signal format of the other ports; the method comprises the steps of:

recognizing a message of a context wherein access to a telephony feature is specified, said message having been signalled from a port connected apparatus;

determining the specified feature to require one of
i) sole participation of the key telephone system; and
ii) participation of the telephone exchange;

in a case of i) invoking the specified telephony feature, and in a case of ii) emulating a feature access protocol of the telephone exchange in response to the context of the message; and signalling the emulated feature access protocol via the telephone line, whereby a user of said port connected apparatus may be availed of a feature of the telephone exchange.

10. A method of initiating a call progress in a key telephone system, the key telephone system including a first plurality of ports, each of which is available for connection of a telephone line of a telephone exchange, another plurality of ports each of which is available for connection of an apparatus thereto, each port connected apparatus including an interface device for exchanging signals with the port in an operating signal format of the port and means associated with the first plurality of ports for translating between a signalling and supervision format of the telephone line and the operating signal format of the other ports; the method comprises the steps of:

a) recognizing a dialled number of a call progress as being one of,
i) a number which corresponds to a directory number within a number plan of the key telephone system,
ii) a number which does not correspond to a directory number within a number plan of the key telephone system;

b) in a case of i), continuing the call progress within the key telephone system; and c) in a case of ii), seizing the telephone line and continuing the call progress via the telephone line and the telephone exchange.

11. A key telephone system comprising:

means for providing communications paths between any of a plurality of key telephone sets, and between any of the plurality of key telephone sets and selectable ones of telephone line interfaces for connection to telephone trunk lines associated with a telephone exchange;

means for recognizing a message of a context indicative of an attempt by a user of one of the plurality of key telephone sets to access a telephony feature foreign to the key telephone system, but otherwise implementable by way of the telephone exchange, and for providing indication of same;

means for seizing one of the line interfaces and causing one of said communication paths to be provided between the key telephone set and the seized line interface, in response to said indication; and means for generating a message in a protocol of said telephone exchange of the context of the first mentioned message and for transmitting the generated message via the seized line interface, whereby the telephony feature is invoked at the telephone exchange.

12. A key telephone system comprising:

a first plurality of ports each of which is available for connection to a telephone line of a telephone exchange;

port connectable apparatus each including an interface device for exchanging signals with a port in an operating signal format of the port;

another plurality of ports, each of which is available for connection of one of the port connectable apparatus thereto;

means associated with the first plurality of ports for translating between a signalling and supervision format of the telephone line and the operating signal format of said another plurality ports; and a central processor for directing provisions of communication paths between any of the ports of said another plurality of ports, and between any of the ports of said another plurality of ports and an of the ports of said first plurality of ports; the key telephone system further comprising:

means for recognizing a message in the operating signal format of said another plurality of ports, as representative of a dialled number which appears to corresponds to one of;
x) a public telephony directory number,
y) a directory number of the key telephone system, and
z) neither of x) or y); and means for causing the dialled number to be signalled via the translating means and one of the telephone lines, in response to the recognition of either of x) and z).

* * * * *